United States Patent
Zhang (10) Patent No.: US 11,518,423 B2
(45) Date of Patent: Dec. 6, 2022

(54) FOLDING PICNIC CART

(71) Applicant: Xiangshan Zhang, Zhejiang (CN)

(72) Inventor: Xiangshan Zhang, Zhejiang (CN)

( * ) Notice: Subject to any disclaimer, the term of this patent is extended or adjusted under 35 U.S.C. 154(b) by 99 days.

(21) Appl. No.: 17/107,772

(22) Filed: Nov. 30, 2020

(65) Prior Publication Data

US 2022/0126900 A1   Apr. 28, 2022

(30) Foreign Application Priority Data

Oct. 23, 2020   (CN) .......................... 202011146570.3

(51) Int. Cl.
*B62B 3/02*   (2006.01)
*B62B 5/06*   (2006.01)

(52) U.S. Cl.
CPC ............... *B62B 3/02* (2013.01); *B62B 5/067* (2013.01)

(58) Field of Classification Search
CPC .................................. B62B 3/02; B62B 3/007
See application file for complete search history.

(56) References Cited

U.S. PATENT DOCUMENTS

| | | | | |
|---|---|---|---|---|
| 6,491,318 B1 * | 12/2002 | Galt | .......................... | B62B 3/02 280/42 |
| 9,101,206 B1 * | 8/2015 | Chen | ..................... | B62B 5/0013 |
| 9,145,154 B1 * | 9/2015 | Horowitz | .................. | B62B 3/02 |
| 9,855,962 B1 * | 1/2018 | Chen | ....................... | B62B 3/025 |
| 9,896,118 B2 * | 2/2018 | Choi | ........................ | B62B 3/007 |
| 9,969,227 B1 * | 5/2018 | McNeave | ............... | B62B 3/007 |
| 10,040,470 B1 * | 8/2018 | Horowitz | ................ | B62B 3/102 |
| 10,099,711 B1 * | 10/2018 | Sun | ......................... | B62B 3/007 |
| 10,099,712 B1 * | 10/2018 | Sun | ......................... | B62B 5/067 |
| 10,435,055 B1 * | 10/2019 | Zhu | ......................... | B62B 3/007 |
| 10,464,588 B1 * | 11/2019 | Lin | ........................... | B62B 7/08 |
| 10,501,103 B1 * | 12/2019 | Wang | ...................... | B62B 3/025 |

(Continued)

FOREIGN PATENT DOCUMENTS

| CN | 103693086 A | * | 4/2014 | ............. B62B 3/007 |
|---|---|---|---|---|
| CN | 110001722 A | * | 7/2019 | ............... B62B 3/02 |

(Continued)

*Primary Examiner* — Katy M Ebner (57) ABSTRACT

The invention discloses a novel sheet folding trailer, comprising pocket component, front-frame component, rear-frame component, bottom-frame component, wheel component, handle component, wherein vertical skeleton unit of the invention comprises front-frame component and rear-frame component, the pocket component is arranged between front-frame component and rear-frame component, the bottom-frame component comprises front bottom-frame component, rear bottom-frame component, bottom-frame U-shaped hinge, drive tube component, the wheel component comprises universal wheel fork a, universal wheel fork b, directional wheel fork a, directional wheel fork b, torque tube a, torque tube b, the handle component is arranged at one side of front-frame component, the handle component and the front-frame component are connected through linkage component. Through structural optimization, the invention has a small folding height, a large capacity after opening, and has a simple side structure by adopting only two parts, which effectively reduces the product cost, moreover, the folding height thereof will not change.

8 Claims, 12 Drawing Sheets

(56) References Cited

U.S. PATENT DOCUMENTS

| | | | |
|---|---|---|---|
| 10,633,010 B1 * | 4/2020 | Zhang | B62B 3/025 |
| 10,953,903 B1 * | 3/2021 | Park | B62B 3/007 |
| 10,988,153 B1 * | 4/2021 | Horowitz | B62B 7/008 |
| 11,225,277 B1 * | 1/2022 | Sun | B62B 5/061 |
| 11,285,983 B1 * | 3/2022 | Horowitz | B62B 3/003 |
| 2011/0204598 A1 * | 8/2011 | Stevenson | B62B 3/02 280/639 |
| 2014/0001735 A1 * | 1/2014 | Yang | B62B 3/02 280/651 |
| 2014/0353947 A1 * | 12/2014 | Frankel | B62B 3/027 280/651 |
| 2015/0035258 A1 * | 2/2015 | Chen | B62B 3/007 280/651 |
| 2015/0145224 A1 * | 5/2015 | Zhu | B62B 3/007 280/42 |
| 2016/0347338 A1 * | 12/2016 | Vargas, II | B62B 3/02 |
| 2018/0057035 A1 * | 3/2018 | Choi | B62B 9/26 |
| 2018/0297622 A1 * | 10/2018 | Chen | B62B 3/007 |
| 2018/0327011 A1 * | 11/2018 | Horowitz | B62B 5/067 |
| 2020/0031376 A1 * | 1/2020 | Horowitz | B62B 3/025 |
| 2020/0207392 A1 * | 7/2020 | Wang | B62B 3/001 |
| 2021/0039696 A1 * | 2/2021 | Tong | B62B 3/02 |
| 2021/0107548 A1 * | 4/2021 | Wang | B62B 3/007 |
| 2021/0107549 A1 * | 4/2021 | Wang | B62B 3/007 |
| 2021/0114643 A1 * | 4/2021 | Sun | B62B 5/067 |
| 2021/0284216 A1 * | 9/2021 | Sun | B62B 3/007 |
| 2021/0291886 A1 * | 9/2021 | Zehfuss | B62B 9/14 |
| 2021/0300450 A1 * | 9/2021 | Yang | B62B 5/067 |
| 2022/0041199 A1 * | 2/2022 | Tong | B62B 3/025 |

FOREIGN PATENT DOCUMENTS

| | | | | |
|---|---|---|---|---|
| CN | 209305620 U | * | 8/2019 | B62B 3/002 |
| CN | 109305205 B | * | 11/2019 | B62B 3/007 |
| CN | 210478755 U | * | 5/2020 | B62B 3/002 |
| CN | 112249113 A | * | 1/2021 | B62B 3/02 |
| DE | 102019125729 B3 | * | 4/2020 | |
| EP | 3696050 A1 | * | 8/2020 | |
| IL | 274605 A | * | 3/2021 | B62B 3/02 |
| WO | WO-2021257824 A1 | * | 12/2021 | |

* cited by examiner

FOLDING PICNIC CART

BACKGROUND OF THE INVENTION

1. Field of the Invention

The invention relates to the technical field of trailer, in particular to a novel sheet folding trailer.

2. Description of the Related Art

In the prior art, the folding height of sheet folding trailer is higher than the height in opened state thereof, the prior sheet folding trailer has a small capacity and a large folding volume, and the number of parts used in the side structure is more than 4-6, that is, the prior sheet folding trailer has complex side structure, uses many parts and is with high costs.

SUMMARY OF THE INVENTION

The technical problem to be solved by the invention is to provide a novel sheet folding trailer for the above problems.

In order to solve above technical problems, the invention provides the following technical schemes: a, comprising pocket component, front-frame component, rear-frame component, bottom-frame component, wheel component, handle component, wherein vertical skeleton unit of the sheet folding trailer comprises front-frame component and rear-frame component, the front-frame component comprises a front-frame U-shaped tube, a front-frame horizontal tube, a tri-glide button a, and a tri-glide button b, the front-frame U-shaped tube and the front-frame horizontal tube are fixed together by welding to form a rectangular frame of the front-frame component, the tri-glide button a and tri-glide button b are arranged at two ends of the front-frame U-shaped tube respectively, and simultaneously, the horizontal height of the tri-glide button a and tri-glide button b is the same, the rear-frame component comprises a rear-frame U-shaped tube, a rear-frame horizontal tube, a tri-glide button c, and a tri-glide button d, the pocket component is arranged between the front-frame component and the rear-frame component, one end of the pocket component is fastened to the tri-glide button a and tri-glide button b on top of the front-frame U-shaped tube through mesh belt respectively, the other end of the pocket component is fastened to the tri-glide button c and tri-glide button d on top of the rear-frame U-shaped tube through mesh belt respectively, four mesh belts are provided, and are fixed on edge of the pocket component by sewing, the bottom-frame component comprises front bottom-frame component, rear bottom-frame component, bottom-frame U-shaped hinge, and drive tube component, wherein the front bottom-frame component comprises front bottom-frame elbow a, front bottom-frame elbow b, and front bottom-frame horizontal tubes, one ends of the front bottom-frame elbow a and the front bottom-frame elbow b are connected to the front-frame U-shaped tube by rivets to form a foldable mechanism, the front bottom-frame horizontal tubes comprise three horizontal tubes with different lengths, and the horizontal tubes are vertically arranged between the front bottom-frame elbow a and the front bottom-frame elbow b, the drive tube component comprises front bottom-frame drive tube a, front bottom-frame drive tube b, rear bottom-frame drive tube a, rear bottom-frame drive tube b, and sliding sleeves, the sliding sleeves are provided with four, comprising sliding sleeve a, sliding sleeve b, sliding sleeve c, and sliding sleeve d, the front bottom-frame drive tube a is arranged at one side of the front bottom-frame elbow a, the front bottom-frame drive tube a (4-8) and the front bottom-frame elbow a are connected by a rivet, and a folding rotation point is formed at the rivet connection, one end of the front bottom-frame drive tube a is connected to the front-frame U-shaped tube through the sliding sleeve a, a rotatable hinge connection is formed between the front bottom-frame drive tube a and the sliding sleeve a by a hinge pin, and a hinge connection is provided between the front bottom-frame drive tube a and the rear bottom-frame drive tube a by a rivet, the wheel component comprises universal wheel fork a, universal wheel fork b, directional wheel fork a, directional wheel fork b, torque tube a and torque tube b, wherein the universal wheel fork a, the universal wheel fork b, the directional wheel fork a and the directional wheel fork b are respectively provided with rubber wheel, the universal wheel fork a is arranged on bottom side surface of the front-frame horizontal tube, the torque tube a is arranged between the universal wheel fork a and the front-frame horizontal tube, the torque tube a is arranged in vertical direction and is connected to the front-frame horizontal tube by welding, the directional wheel fork a is arranged at bottom end of the rear-frame horizontal tube and is fixed and connected to the rear-frame horizontal tube by welding, the handle component is arranged at one side of the front-frame component, the handle component and the front-frame component are arranged and connected through linkage component.

Compared to the prior art, the advantageous effects of the invention are as follows: through structural optimization, the folding trailer of the invention has a very small folding height, a large capacity after opening, and has a simple side structure for adopting only two parts, which effectively reduces the cost of the product, moreover, the folding height thereof will not change, same folding height as the use height ensures that the folding volume is smaller than the size of the prior sheet folding trailer, thereby effectively reducing the cost of the product and promoting to the market at a more competitive price.

As an improvement, the rear-frame U-shaped tube and the rear-frame horizontal tube are fixed by welding to form a rectangular frame of the rear-frame component, and the tri-glide button c and tri-glide button d are arranged at two ends of the rear-frame U-shaped tube respectively, and simultaneously, the horizontal height of the tri-glide button c and tri-glide button d is the same.

As an improvement, the rear bottom-frame component comprises rear bottom-frame elbow a, rear bottom-frame elbow b, and rear bottom-frame horizontal tubes, one ends of the rear bottom-frame elbow a and the rear bottom-frame elbow b are connected to the rear-frame U-shaped tube by rivets to form a foldable mechanism, two sets of bottom-frame U-shaped hinge are arranged, and the other end of the rear bottom-frame elbow a and the front bottom-frame elbow a are respectively fixed to flaps of the bottom-frame U-shaped hinge by welding to form a hinge connection, the other end of the rear bottom-frame elbow b and the front bottom-frame elbow b are respectively fixed to flaps of the bottom-frame U-shaped hinge by welding to form a hinge connection, the rear bottom-frame horizontal tubes comprise three horizontal tubes with different lengths, and the horizontal tubes are vertically arranged between the rear bottom-frame elbow a and the rear bottom-frame elbow b.

As an improvement, the front bottom-frame drive tube b is arranged at one side of the front bottom-frame elbow b, the front bottom-frame drive tube b and the front bottom-frame elbow b are connected by a rivet, and a folding rotation point is formed at the rivet connection, one end of the front bottom-frame drive tube b is connected to the front-frame U-shaped tube through the sliding sleeve b, a rotatable hinge connection is formed between the front bottom-frame drive tube b and the sliding sleeve b by a hinge pin.

As an improvement, the rear bottom-frame drive tube a is arranged at one side of the rear bottom-frame elbow a, the rear bottom-frame drive tube a and the rear bottom-frame elbow a are connected by a rivet, and a folding rotation point is formed at the rivet connection, and one end of the rear bottom-frame drive tube a is connected to the rear-frame U-shaped tube through the sliding sleeve d, a rotatable hinge connection is formed between the rear bottom-frame drive tube a and the the sliding sleeve d by a hinge pin.

As an improvement, the rear bottom-frame drive tube b is arranged at one side of the rear bottom-frame elbow b, the rear bottom-frame drive tube b and the rear bottom-frame elbow b are connected by a rivet, and a folding rotation point is formed at the rivet connection, and one end of the rear bottom-frame drive tube b is connected to the rear-frame U-shaped tube through the sliding sleeve c, a rotatable hinge connection is formed between the rear bottom-frame drive tube b and the sliding sleeve c by a hinge pin, and a hinge connection is provided between the front bottom-frame drive tube b and the rear bottom-frame drive tube b by a rivet.

As an improvement, the universal wheel fork b is arranged on bottom side surface of the front-frame horizontal tube, the torque tube b is arranged between the universal wheel fork b (5-2) and the front-frame horizontal tube, the torque tube b is arranged in vertical direction and is connected to the front-frame horizontal tube by welding.

As an improvement, the directional wheel fork b is arranged at bottom end of the rear-frame horizontal tube, and is fixed and connected to the rear-frame horizontal tube by welding.

BRIEF DESCRIPTION OF THE DRAWINGS

FIG. 1 shows the structure of the a.
FIG. 2 shows the frame structure of a.
FIG. 3 is supplement diagram 1 of the structure of a.
FIG. 4 is supplement diagram 2 of the structure of a.
FIG. 5 is supplement diagram 3 of the structure of a.
FIG. 6 is supplement diagram 4 of the structure of a.

Figure 1:
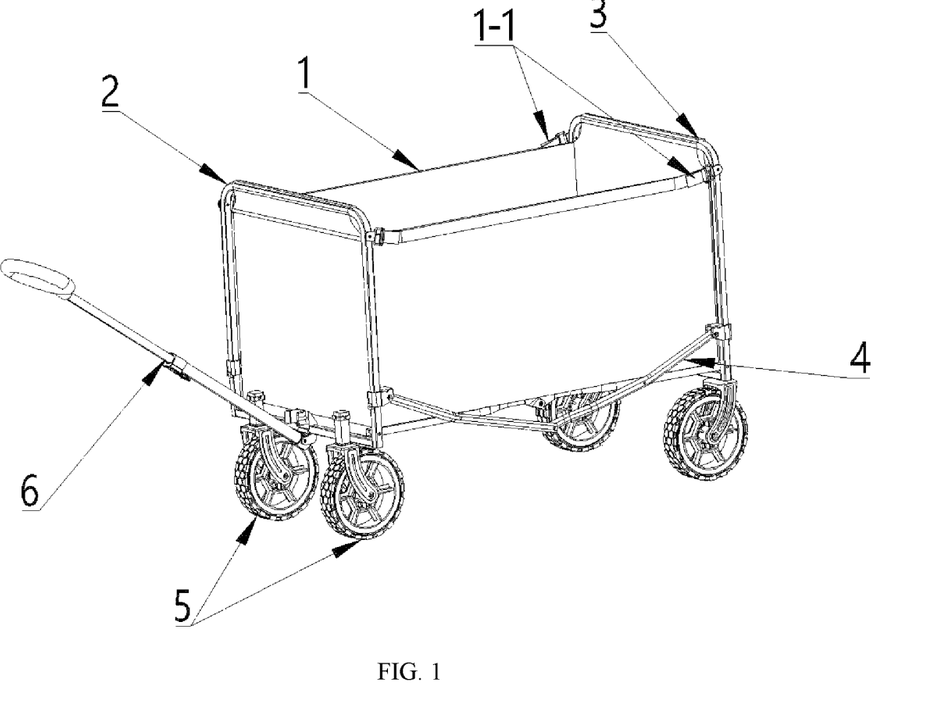
Figure 2:
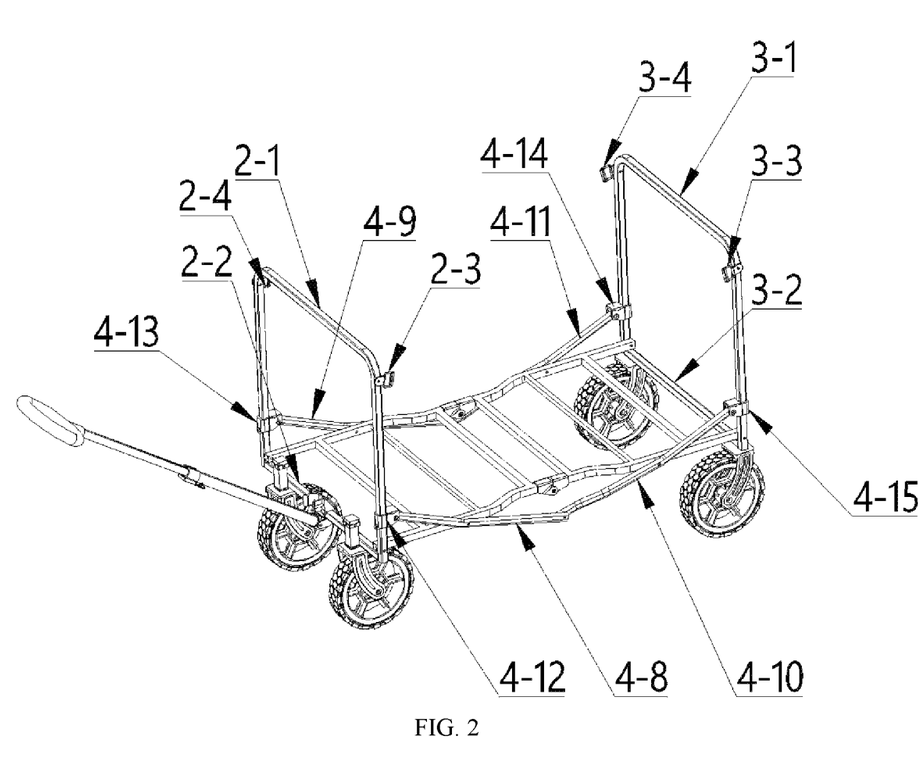
Figure 3:
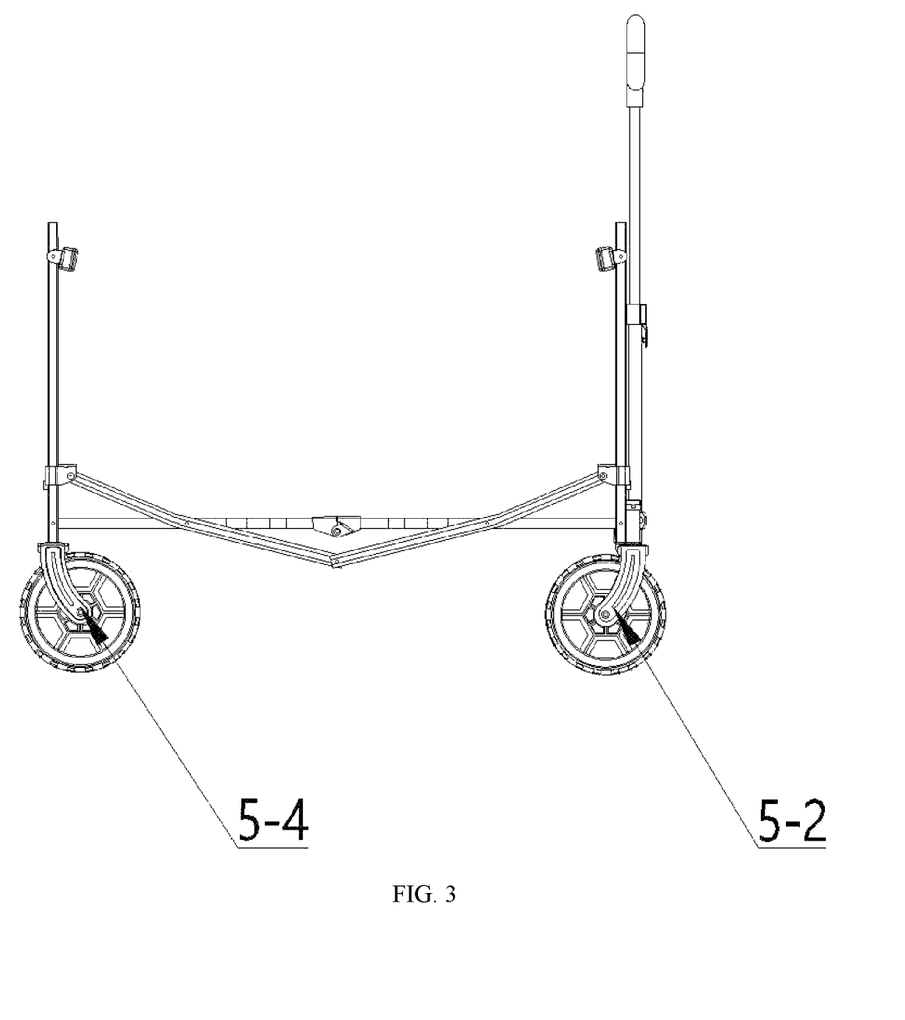
Figure 4:
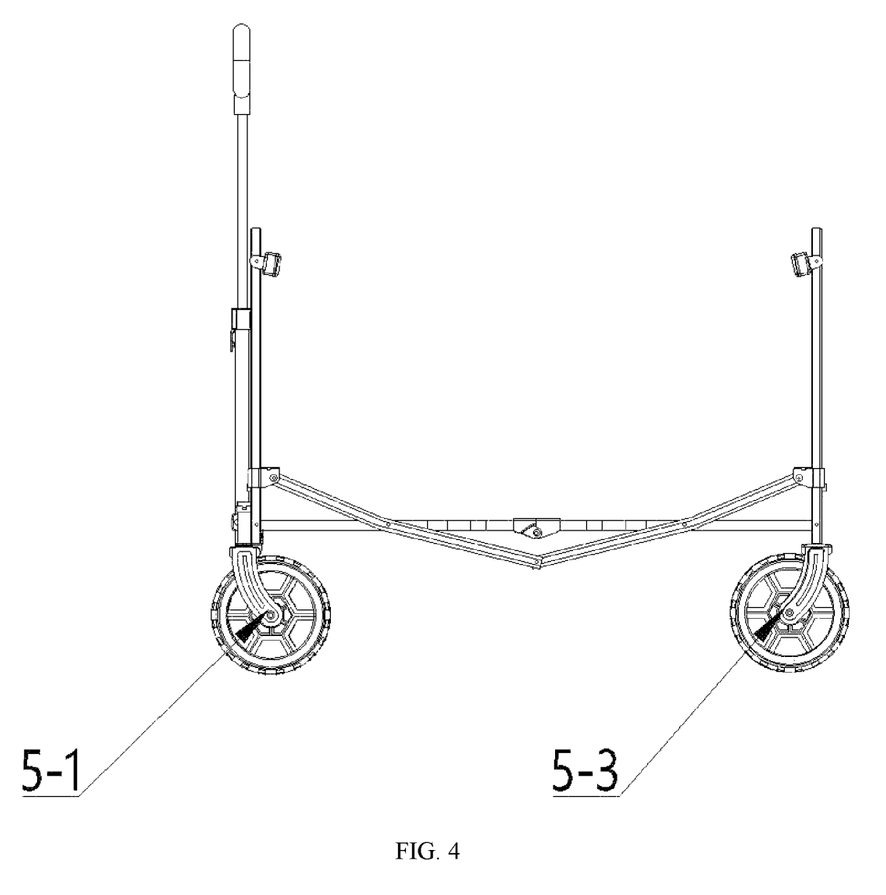
Figure 5:
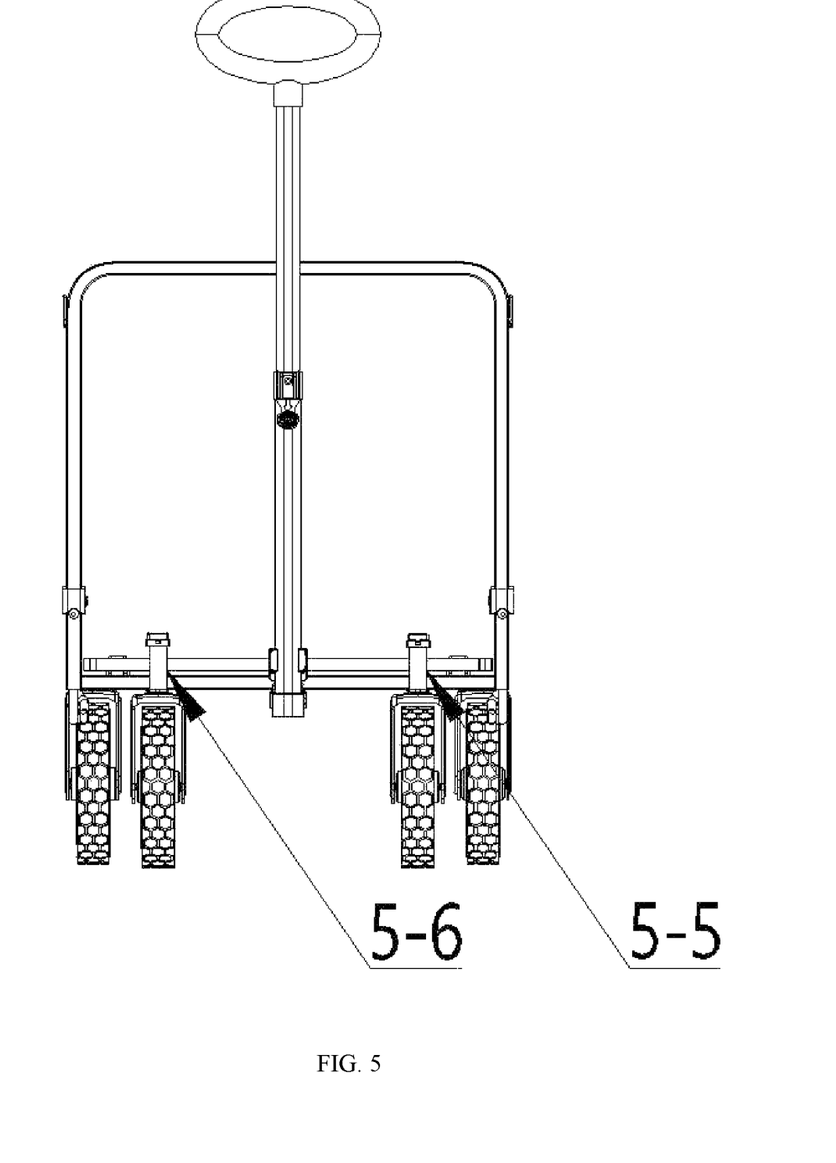
Figure 6:
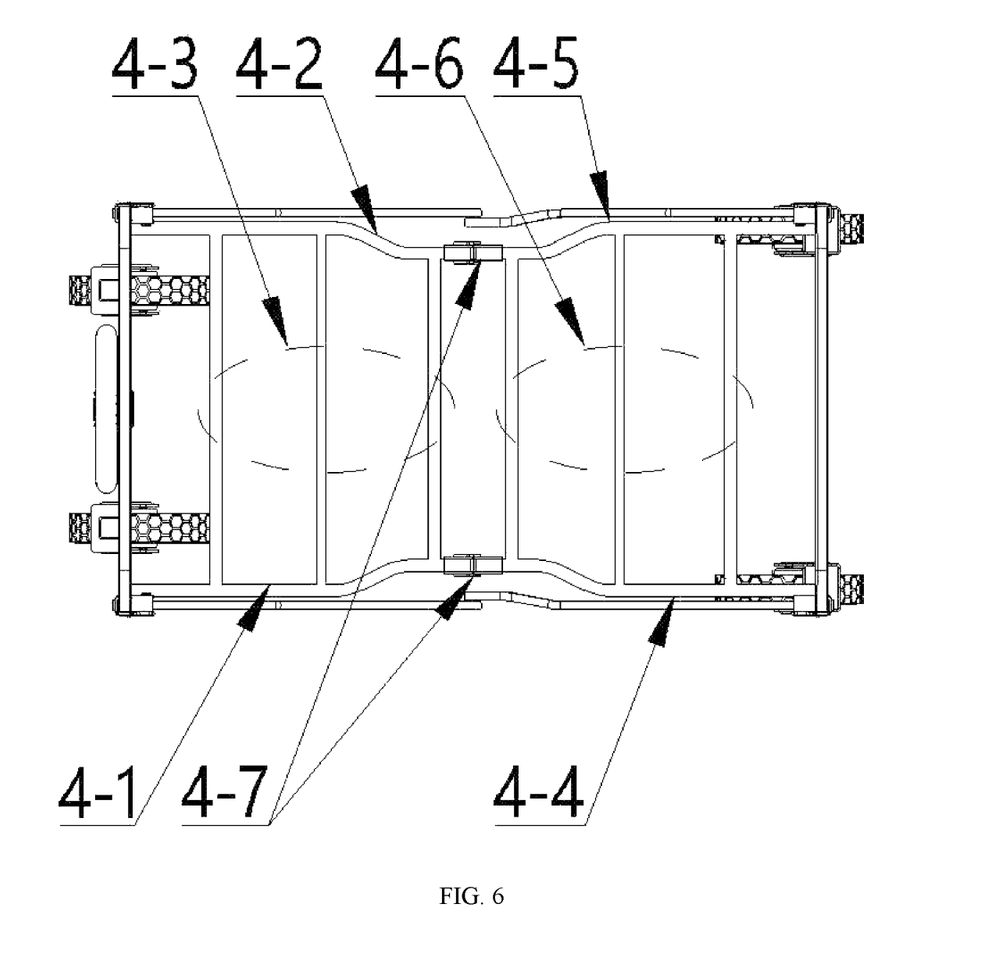
Figure 7:
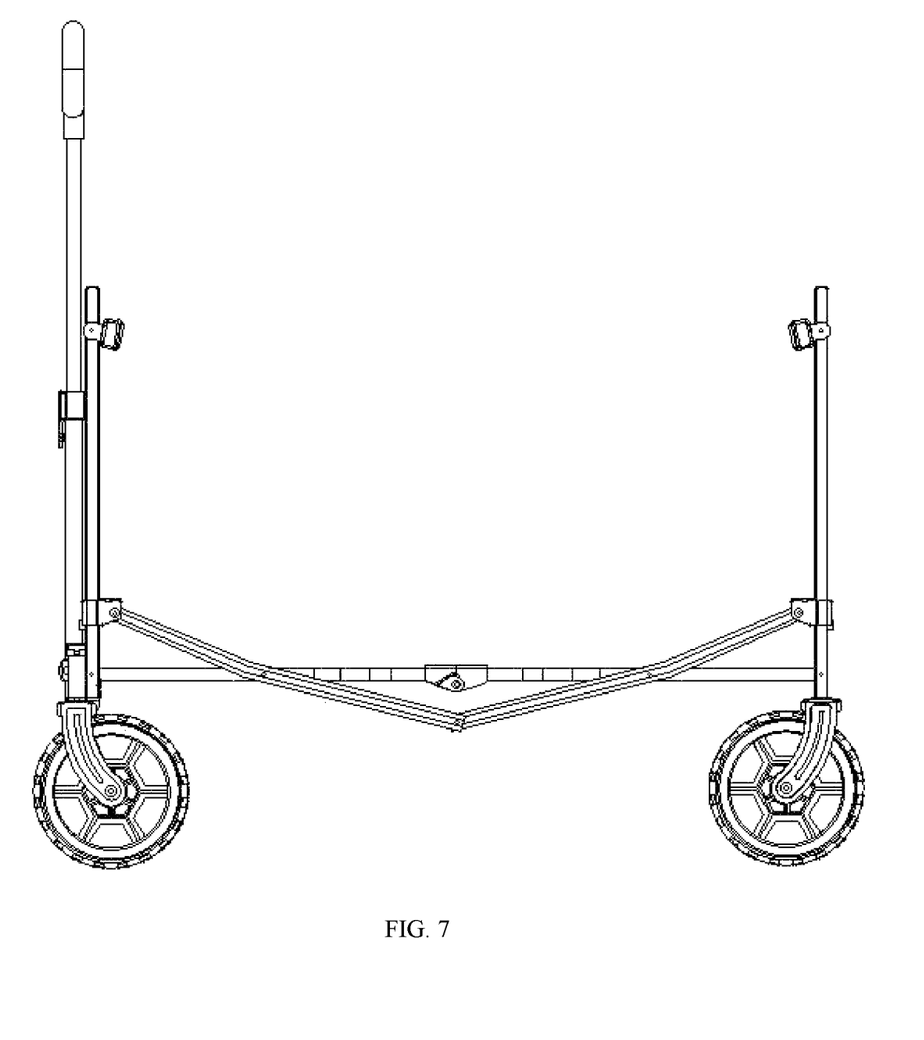
FIG. 7 is a schematic diagram showing the unfolding state of the side of a novel sheet folding trailer.
Figure 8:
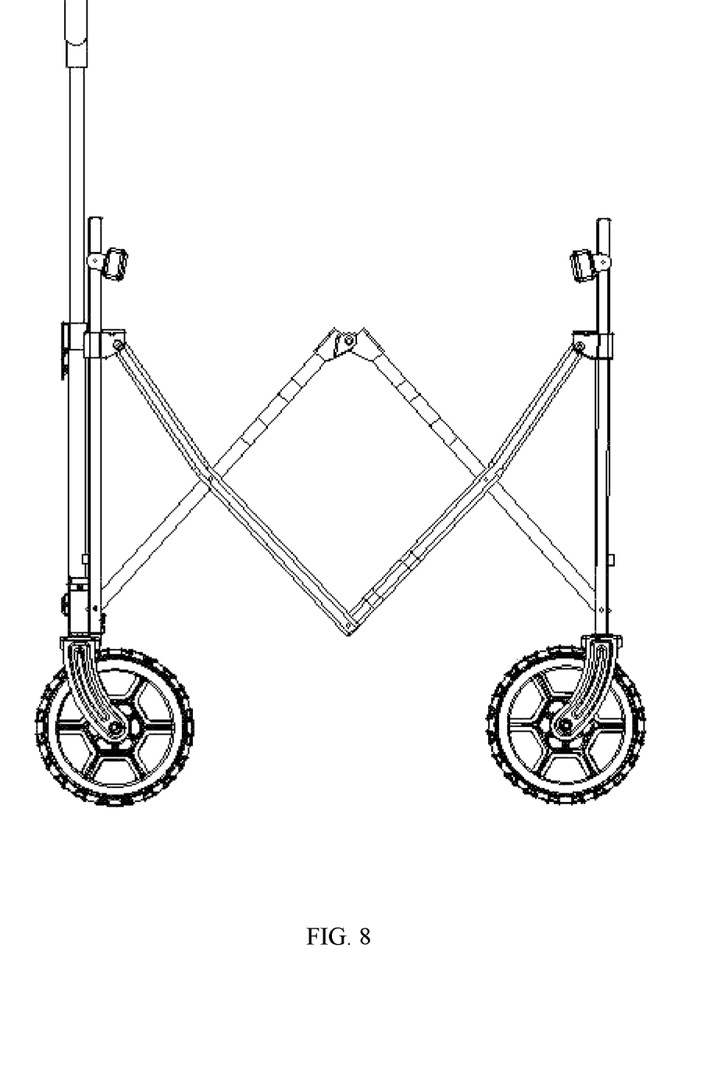
FIG. 8 is a schematic diagram showing the half-folded state of the side of a novel sheet folding trailer.
Figure 9:
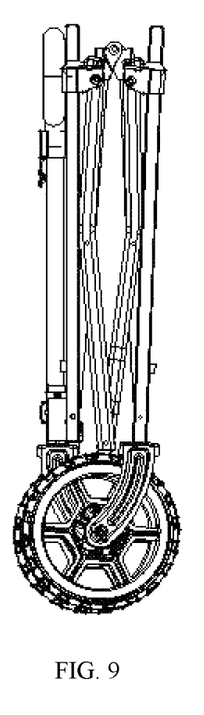
FIG. 9 is a schematic diagram showing the folding state of the side of a novel sheet folding trailer.
Figure 10:
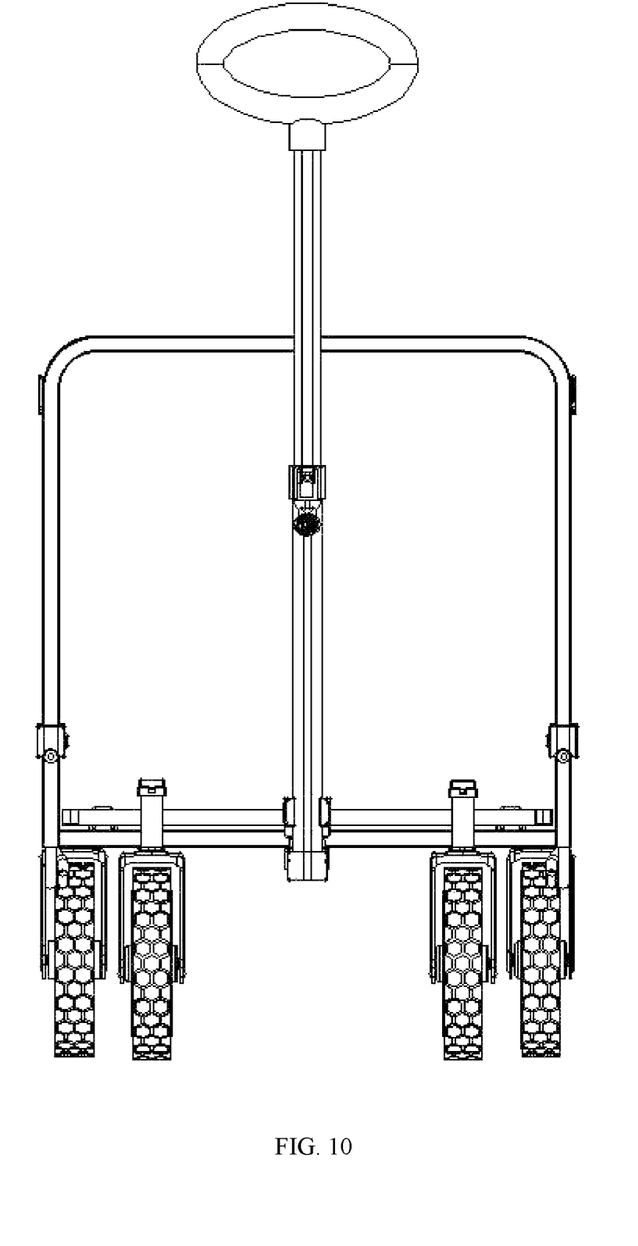
FIG. 10 is a schematic diagram showing the unfolding state of the front of a novel sheet folding trailer.
Figure 11:
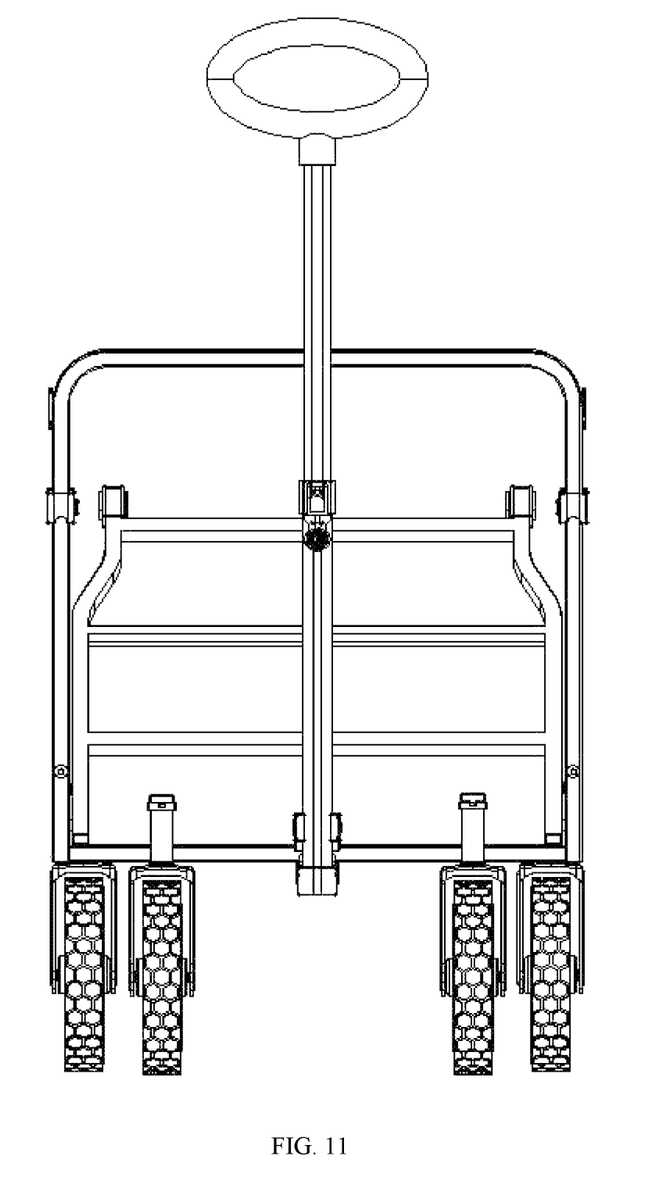
FIG. 11 is a schematic diagram showing the half-folded state of the front of a novel sheet folding trailer.
Figure 12:
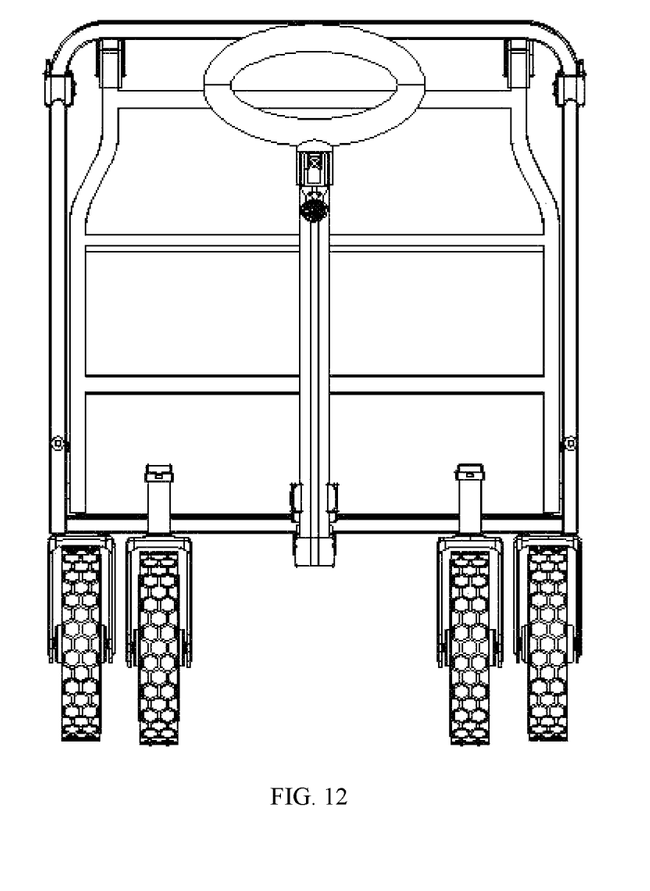
FIG. 12 is a schematic diagram showing the folding state of the front of a novel sheet folding trailer.

In the accompanying drawings, 1 refers to pocket component, 1-1 refers to mesh belt, 2 refers to front-frame component, 2-1 refers to front-frame U-shaped tube, 2-2 refers to front-frame horizontal tube, 2-3 refers to tri-glide button a, 2-4 refers to tri-glide button b, 3 refers to rear-frame component, 3-1 refers to rear-frame U-shaped tube, 3-2 refers to rear-frame horizontal tube, 3-3 refers to tri-glide button c, 3-4 refers to tri-glide button d, 4 refers to bottom-frame component, 4-1 refers to front bottom-frame elbow a, 4-2 refers to front bottom-frame elbow b, 4-3 refers to front bottom-frame horizontal tube, 4-4 refers to rear bottom-frame elbow a, 4-5 refers to rear bottom-frame elbow b, 4-6 refers to rear bottom-frame horizontal tube, 4-7 refers to bottom-frame U-shaped hinge, 4-8 refers to front bottom-frame drive tube a, 4-9 refers to front bottom-frame drive tube b, 4-10 refers to rear bottom-frame drive tube a, 4-11 refers to rear bottom-frame drive tube b, 4-12 refers to sliding sleeve a, 4-13 refers to sliding sleeve b, 4-14 refers to sliding sleeve c, 4-15 refers to sliding sleeve d, 5 refers to wheel component, 5-1 refers to universal wheel fork a, 5-2 refers to universal wheel fork b, 5-3 refers to directional wheel fork a, 5-4 refers to directional wheel fork b, 5-5 refers to torque tube a, 5-6 refers to torque tube b, 6 refers to handle component.

DETAILED DESCRIPTION OF THE PREFERRED EMBODIMENTS

The invention is further described in detail below with reference to the accompanying drawings.

In specific embodiment of the invention, the invention provides a, comprising pocket component 1, front-frame component 2, rear-frame component 3, bottom-frame component 4, wheel component 5, handle component 6, wherein vertical skeleton unit of the sheet folding trailer comprises front-frame component 2 and rear-frame component 3, the front-frame component 2 comprises a front-frame U-shaped tube 2-1, a front-frame horizontal tube 2-2, a tri-glide button a 2-3, and a tri-glide button b 2-4, the front-frame U-shaped tube 2-1 and the front-frame horizontal tube 2-2 are fixed together by welding to form a rectangular frame of the front-frame component 2, the tri-glide button a 2-3 and tri-glide button b 2-4 are arranged at two ends of the front-frame U-shaped tube 2-1 respectively, and simultaneously, the horizontal height of the tri-glide button a 2-3 and tri-glide button b 2-4 is the same, the rear-frame component 3 comprises a rear-frame U-shaped tube 3-1, a rear-frame horizontal tube 3-2, a tri-glide button c 3-3, and a tri-glide button d 3-4, the pocket component 1 is arranged between the front-frame component 2 and the rear-frame component 3, one end of the pocket component 1 is fastened to the tri-glide button a 2-3 and tri-glide button b 2-4 on top of the front-frame U-shaped tube 2-1 through mesh belt 1-1 respectively, the other end of the pocket component 1 is fastened to the tri-glide button c 3-3 and tri-glide button d 3-4 on top of the rear-frame U-shaped tube 3-1 through mesh belt 1-1 respectively, four mesh belts 1-1 are provided, and are fixed on edge of the pocket component 1 by sewing, the bottom-frame component 4 comprises front bottom-frame component, rear bottom-frame component, bottom-frame U-shaped hinge 4-7, and drive tube component, wherein the front bottom-frame component comprises front bottom-frame elbow a 4-1, front bottom-frame elbow b 4-2, and front bottom-frame horizontal tubes 4-3, one ends of the front bottom-frame elbow a 4-1 and the front bottom-frame elbow b 4-2 are connected to the front-frame U-shaped tube 2-1 by rivets to form a foldable mechanism, the front bottom-frame horizontal tubes 4-3 comprise three horizontal tubes with different lengths, and the horizontal tubes are vertically arranged between the front bottom-frame elbow a 4-1 and the front bottom-frame elbow b 4-2, the drive tube component comprises front bottom-frame drive tube a 4-8, front bottom-frame drive tube b 4-9, rear bottom-frame drive tube a 4-10, rear bottom-frame drive tube b 4-11, and sliding sleeves, the sliding sleeves are provided with four, comprising sliding sleeve a 4-12, sliding sleeve b 4-13, sliding sleeve c 4-14, and sliding sleeve d 4-15, the front bottom-frame drive tube a 4-8 is arranged at one side of the front bottom-frame elbow a 4-1, the front bottom-frame drive tube a 4-8 and the front bottom-frame elbow a 4-1 are connected by a rivet, and a folding rotation point is formed at the rivet connection, one end of the front bottom-frame drive tube a 4-8 is connected to the front-frame U-shaped tube 2-1 through the sliding sleeve a 4-12, a rotatable hinge connection is formed between the front bottom-frame drive tube a 4-8 and the sliding sleeve a 4-12 by a hinge pin, and a hinge connection is provided between the front bottom-frame drive tube a 4-8 and the rear bottom-frame drive tube a 4-10 by a rivet, the wheel component 5 comprises universal wheel fork a 5-1, universal wheel fork b 5-2, directional wheel fork a 5-3, directional wheel fork b 5-4, torque tube a 5-5 and torque tube b 5-6, wherein the universal wheel fork a 5-1, the universal wheel fork b 5-2, the directional wheel fork a 5-3 and the directional wheel fork b 5-4 are respectively provided with rubber wheel, the universal wheel fork a 5-1 is arranged on bottom side surface of the front-frame horizontal tube 2-2, the torque tube a 5-5 is arranged between the universal wheel fork a 5-1 and the front-frame horizontal tube 2-2, the torque tube a 5-5 is arranged in vertical direction and is connected to the front-frame horizontal tube 2-2 by welding, the directional wheel fork a 5-3 is arranged at bottom end of the rear-frame horizontal tube 3-2 and is fixed and connected to the rear-frame horizontal tube 3-2 by welding, the handle component 6 is arranged at one side of the front-frame component 2, the handle component 6 and the front-frame component 2 are arranged and connected through linkage component.

The operating principle of the invention: in the folding process of the folding trailer in the invention, the rotation points at one ends of the front bottom-frame elbow a and front bottom-frame elbow b in the bottom-frame component are first connected to the rotation point at bottom of the front-frame U-shaped tube respectively. The rotation points at one ends of the rear bottom-frame elbow a and rear bottom-frame elbow b are connected to the rotation point at bottom of the rear-frame U-shaped tube respectively. Simultaneously, one end of the front bottom-frame drive tube a is connected to the rotation point of sliding sleeve a, one end of the front bottom-frame drive tube b is connected to the rotation point of sliding sleeve b, one end of the rear bottom-frame drive tube a is connected to the rotation point of sliding sleeve d, and the rear bottom-frame drive tube b is connected to the rotation point of sliding sleeve c, moreover, the sliding sleeve a an the sliding sleeve b are slidingly connected on the front-frame U-shaped tube, and the sliding sleeve and the sliding sleeve d are slidingly connected on the front-frame U-shaped tube.

Before folding, the short horizontal tube in the front bottom-frame horizontal tubes near the rotation point of the bottom-frame U-shaped hinge and the short horizontal tube in the rear bottom-frame horizontal tubes near the rotation point of the bottom-frame U-shaped hinge are lifted up simultaneously, the two bottom-frame U-shaped hinges simultaneously move upwards synchronously around axis of the space center where the two rotation points are located, the common rotation point of the front bottom-frame drive tube a and the rear bottom-frame drive tube a moves downward, the rotation point shared by the front bottom-frame drive tube a and the front bottom-frame elbow a and the rotation point shared by the rear bottom-frame drive tube a and the rear bottom-frame elbow a move close to each other. The other end of the front bottom-frame drive tube a drives the sliding sleeve a to slide upwards and fold along the front-frame U-shaped tube by the common rotation point, and the other end of the rear bottom-frame drive tube a drives the sliding sleeve d to slide upwards and fold along the rear-frame U-shaped tube by the common rotation point, driven by the linkage folding of the bottom-frame component, the front-frame U-shaped tube and the rear-frame U-shaped tube move closer to each other to achieve folding.

Moreover, the terms "the first" and "the second" are merely used for descriptive purposes and are not to be understood to indicate or imply the relative importance or implicitly indicate the number of technical features indicated. Thereby, the features defined by "the first", "the second" may comprise one or more of the features, either explicitly or implicitly, and in the description of the invention, "multiple" means two or more unless there are clear and specific restrictions.

In the invention, the terms of "arrange", "link", "connect", "fix" and etc., should be generally understood unless there are specific restrictions or stipulations. For example, the "connect" may refer to fixed connection, detachable connection or integral connection; the "connect" may also refer to mechanical connection or electrical connection; the means of "connect" may be directly connected or indirectly connected through an intermediate medium, and may be internal communication between the two elements. For those skilled in the art, the specific meaning of the above terms in the invention can be understood according to the specific situation.

In the invention, unless there are specific restrictions or stipulations, the first feature is "above" or "below" the second feature may include an embodiment where the first feature is in direct contact with the second feature, and may further include an embodiment where the first feature may not be in direct contact with the second feature instead contacting through another feature formed between them. Moreover, that the first feature is "upward", "above" and "over" the second feature may comprise that the first feature is directly above and obliquely above the second feature, or simply means that the horizontal height of first feature is higher than that of the second feature. The first feature is "downward", "below" and "under" the second feature may comprise that the first feature is directly below and obliquely below the second feature, or simply means that the horizontal height is less than that of the second feature.

In the description of the disclosure, the reference terms "one embodiment", "some embodiments", "example", "specific example", "some examples" and etc., may refer to that the specific features, structures, materials or characteristics described by combining the embodiment or example are included in at least one embodiment or example. In the specification, schematic statement of above terms does not necessarily refer to the same embodiment or example. In addition, the described specific features, structures, materials, or characteristics may be combined in any one or more embodiments or examples in an appropriate manner.

Although the embodiments of the invention have been shown and described above, it is understood that the embodiments described above are illustrative and are not to limit the scope of the invention. Any changes, modifications, replacements and variations of above embodiments may be made by those skilled in the art without departing from the principle and spirit of the invention and should be included in the protection scope of the invention.

What is claimed is:

1. A folding picnic cart, comprising a pocket component (1), a front-frame component (2), a rear-frame component (3), a bottom-frame component (4), a wheel component (5), a handle component (6), wherein vertical skeleton unit of the sheet folding trailer comprises the front-frame component (2) and the rear-frame component (3), the front-frame component (2) comprises a front-frame U-shaped tube (2-1), a front-frame horizontal tube (2-2), a buckle a (2-3), and a buckle b (2-4), the front-frame U-shaped tube (2-1) and the front-frame horizontal tube (2-2) are fixed together by welding to form a rectangular frame of the front-frame component (2), the buckle a (2-3) and buckle b (2-4) are arranged at two ends of the front-frame U-shaped tube (2-1) respectively, and simultaneously, the horizontal height of the buckle a (2-3) and buckle b (2-4) is the same, the rear-frame component (3) comprises a rear-frame U-shaped tube (3-1), a rear-frame horizontal tube (3-2), a buckle c (3-3), and a buckle d (3-4), the pocket component (1) is arranged between the front-frame component (2) and the rear-frame component (3), one end of the pocket component (1) is fastened to the buckle a (2-3) and buckle b (2-4) on top of the front-frame U-shaped tube (2-1) through mesh belt (1-1) respectively, the other end of the pocket component (1) is fastened to the buckle c (3-3) and buckle d (3-4) on top of the rear-frame U-shaped tube (3-1) through mesh belt (1-1) respectively, four mesh belts (1-1) are provided, and are fixed on edge of the pocket component (1) by sewing, the bottom-frame component (4) comprises a front bottom-frame component, a rear bottom-frame component, a bottom-frame U-shaped hinge (4-7), and a drive tube component, wherein the front bottom-frame component comprises front bottom-frame elbow a (4-1), front bottom-frame elbow b (4-2), and front bottom-frame horizontal tubes (4-3), one ends of the front bottom-frame elbow a (4-1) and the front bottom-frame elbow b (4-2) are connected to the front-frame U-shaped tube (2-1) by rivets to form a foldable mechanism, the front bottom-frame horizontal tubes (4-3) comprise three horizontal tubes, and the horizontal tubes are arranged between the front bottom-frame elbow a (4-1) and the front bottom-frame elbow b (4-2), the drive tube component comprises a front bottom-frame drive tube a (4-8), a front bottom-frame drive tube b (4-9), a rear bottom-frame drive tube a (4-10), a rear bottom-frame drive tube b (4-11), and sliding sleeves, the sliding sleeves comprising a sliding sleeve a (4-12), a sliding sleeve b (4-13), a sliding sleeve c (4-14), and a sliding sleeve d (4-15), the front bottom-frame drive tube a (4-8) is arranged at one side of the front bottom-frame elbow a (4-1), the front bottom-frame drive tube a (4-8) and the front bottom-frame elbow a (4-1) are connected by a rivet, and a folding rotation point is formed at the rivet connection, one end of the front bottom-frame drive tube a (4-8) is connected to the front-frame U-shaped tube (2-1) through the sliding sleeve a (4-12), a rotatable hinge connection is formed between the front bottom-frame drive tube a (4-8) and the sliding sleeve a (4-12) by a hinge pin, and a hinge connection is provided between the front bottom frame drive tube a (4-8) and the rear bottom-frame drive tube a (4-10) by a rivet, the wheel component (5) comprises a universal wheel fork a (5-1), a universal wheel fork b (5-2), a directional wheel fork a (5-3), a directional wheel fork b (5-4), a torque tube a (5-5) and a torque tube b (5-6), wherein the universal wheel fork a (5-1), the universal wheel fork b (5-2), the directional wheel fork a (5-3) and the directional wheel fork b (5-4) are respectively provided with rubber wheel, the universal wheel fork a (5-1) is arranged on bottom side surface of the front-frame horizontal tube (2-2), the torque tube a (5-5) is arranged between the universal wheel fork a (5-1) and the front-frame horizontal tube (2-2), the torque tube a (5-5) is arranged in vertical direction and is connected to the front-frame horizontal tube (2-2) by welding, the directional wheel fork a (5-3) is arranged at bottom end of the rear-frame horizontal tube (3-2) and is fixed and connected to the rear-frame horizontal tube (3-2) by welding, the handle component (6) is arranged at one side of the front-frame component (2), the handle component (6) and the front-frame component (2) are arranged and connected through linkage component.

2. The folding picnic cart of claim 1, wherein the rear-frame U-shaped tube (3-1) and the rear-frame horizontal tube (3-2) are fixed by welding to form a rectangular frame of the rear-frame component (3), and the button buckle c (3-3) and buckle d (3-4) are arranged at two ends of the rear-frame U-shaped tube (3-1) respectively, and simultaneously, the horizontal height of the buckle c (3-3) and buckle d (3-4) is the same.

3. The folding picnic cart of claim 1, wherein the rear bottom-frame component comprises rear bottom-frame elbow a (4-4), rear bottom-frame elbow b (4-5), and rear bottom-frame horizontal tubes (4-6), one ends of the rear bottom-frame elbow a (4-4) and the rear bottom-frame elbow b (4-5) are connected to the rear-frame U-shaped tube (3-1) by rivets to form a foldable mechanism, two bottom-frame U-shaped hinges (4-7) are arranged, and the other end of the rear bottom-frame elbow a (4-4) and the front bottom frame elbow a (4-1) are respectively fixed to flaps of the bottom-frame U-shaped hinge (4-7) by welding to form a hinge connection, the other end of the rear bottom-frame elbow b (4-5) and the front bottom-frame elbow b (4-2) are respectively fixed to flaps of the bottom-frame U-shaped hinge (4-7) by welding to form a hinge connection, the rear bottom-frame horizontal tubes (4-6) comprise three horizontal tubes with different lengths, and the horizontal tubes are vertically arranged between the rear bottom-frame elbow a (4-4) and the rear bottom-frame elbow b (4-5).

4. The folding picnic cart of claim 1, wherein the front bottom-frame drive tube b (4-9) is arranged at one side of the front bottom-frame elbow b (4-2), the front bottom-frame drive tube b (4-9) and the front bottom-frame elbow b (4-2) are connected by a rivet, and a folding rotation point is formed at the rivet connection, one end of the front bottom-frame drive tube b (4-9) is connected to the front-frame U-shaped tube (2-1) through the sliding sleeve b (4-13), a rotatable hinge connection is formed between the front bottom-frame drive tube b (4-9) and the sliding sleeve b (4-13) by a hinge pin.

5. The folding picnic cart of claim 1 or 3, wherein the rear bottom-frame drive tube a (4-10) is arranged at one side of the rear bottom-frame elbow a (4-4), the rear bottom-frame drive tube a (4-10) and the rear bottom-frame elbow a (4-4) are connected by a rivet, and a folding rotation point is formed at the rivet connection, and one end of the rear bottom-frame drive tube a (4-10) is connected to the rear-frame U-shaped tube (3-1) through the sliding sleeve d (4-15), a rotatable hinge connection is formed between the rear bottom-frame drive tube a (4-10) and the sliding sleeve d (4-15) by a hinge pin.

6. The folding picnic cart of claim 1 or 3, wherein the rear bottom-frame drive tube b (4-11) is arranged at one side of the rear bottom-frame elbow b (4-5), the rear bottom frame drive tube b (4-11) and the rear bottom-frame elbow b (4-5) are connected by a rivet, and a folding rotation point is formed at the rivet connection, and one end of the rear bottom-frame drive tube b (4-11) is connected to the rear-frame U-shaped tube (3-1) through the sliding sleeve c (4-14), a rotatable hinge connection is formed between the rear bottom-frame drive tube b (4-11) and the sliding sleeve c (4-14) by a hinge pin, and a hinge connection is provided between the front bottom-frame drive tube b (4-9) and the rear bottom-frame drive tube b (4-11) by a rivet.

7. The folding picnic cart of claim 1, wherein the universal wheel fork b (5-2) is arranged on bottom side surface of the front-frame horizontal tube (2-2), the torque tube b (5-6) is arranged between the universal wheel fork b (5-2) and the front-frame horizontal tube (2-2), the torque tube b (5-6) is arranged in vertical direction and is connected to the front-frame horizontal tube (2-2) by welding.

8. The folding picnic cart of claim 1, wherein the directional wheel fork b (5-4) is arranged at bottom end of the rear-frame horizontal tube (3-2), and is fixed and connected to the rear-frame horizontal tube (3-2) by welding.

\* \* \* \* \*